(12) United States Patent
Ashihara (10) Patent No.: US 6,335,700 B1
(45) Date of Patent: Jan. 1, 2002

(54) RADAR APPARATUS FOR PREVENTING ERRONEOUS DETECTION BY COMPARING SENSITIVITIES OF EACH COMBINATION OF TRANSMITTING AND RECEIVING UNITS

(75) Inventor: Jun Ashihara, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/495,925

(22) Filed: Feb. 2, 2000

(30) Foreign Application Priority Data

Feb. 4, 1999 (JP) .................................. 11-027598

(51) Int. Cl.[7] .............................. G01S 13/34; G01S 7/40
(52) U.S. Cl. ............................................ 342/70; 342/117
(58) Field of Search ................................. 342/70, 72, 117

(56) References Cited

U.S. PATENT DOCUMENTS

| 4,538,150 A | 8/1985 | Bone, Jr. ...................... 343/17.7 |
| 4,656,480 A | 4/1987 | Allezard et al. ............. 342/151 |
| 5,864,314 A | 1/1999 | Ashihara ...................... 342/128 |
| RE36,095 E | 2/1999 | Urabe et al. |
| 5,896,104 A | 4/1999 | Komatsu et al. |

FOREIGN PATENT DOCUMENTS

EP          0 611 969 A1       8/1994

*Primary Examiner*—Ian J. Lobo
(74) *Attorney, Agent, or Firm*—Armstrong, Westerman, Hattori, McLeland & Naughton, LLP (57) ABSTRACT

A radar apparatus for preventing a problem due to an abnormal state such as degradation of a transmitting or receiving unit. The apparatus includes a transmitting section including beam transmitting units for radiating a plurality of beams, where adjacent beams have an overlapped portion; and a receiving section including beam receiving units for receiving reflection waves reflected from a target object. Transmitting and receiving combinations between the beam transmitting units and the beam receiving units are determined so as to detect the position of the target object. The apparatus further includes a sensitivity comparing section for comparing sensitivities with respect to the transmitting and receiving combinations; and an abnormal state determination section for determining an abnormal state of any one of the above units based on a result of the comparison of the sensitivity comparing section.

6 Claims, 8 Drawing Sheets

RADAR APPARATUS FOR PREVENTING ERRONEOUS DETECTION BY COMPARING SENSITIVITIES OF EACH COMBINATION OF TRANSMITTING AND RECEIVING UNITS

BACKGROUND OF THE INVENTION

1. Field of the Invention

The present invention relates to a radar (apparatus) used in a radar system mounted in a vehicle, in particular, to a so-called multi-beam radar apparatus comprising a plurality of transmitters and receivers.

This application is based on Patent Application No. Hei 11-27598 filed in Japan, the contents of which are incorporated herein by reference.

2. Description of the Related Art

Conventionally, a radar apparatus mounted in a vehicle has been used for detecting an obstacle such as a telegraph/telephone pole or a block fence which is present relatively near the radar apparatus, so as to prevent the vehicle from colliding with the obstacle when parking the vehicle into a garage, or the like. Recently, in addition to such detection for preventing collisions with stationary obstacles, radar apparatuses for performing high speed and highly accurate detection of objects which are relatively far from the radar apparatus have also been developed. This type of radar apparatus is used as a warning system for preventing a running vehicle from colliding with a vehicle ahead of the present vehicle, or as an adaptive cruise control (ACC) system.

The main target of such a radar apparatus is an moving object such as a vehicle running ahead of the present vehicle, or a vehicle approaching the present vehicle. Therefore, the possible detection area is a relatively small angular area in front of the present vehicle. However, the necessary distance to be measured is very wide from a close range such as a few tens of centimeters to a range of a few hundred meters corresponding to a vehicle approaching at a high speed. In consideration of the above requirements, a multi-beam radar has been developed, which has a plurality of transmitting units for emitting thin radar beams and a plurality of receiving units for receiving reflection signals. In this structure, it is possible to cover the necessary angular area as well to obtain the necessary measurement sensitivity over a wide range.

For example, U.S. Pat. No. Re 36,095 of the same applicant of the present application discloses an FM-CW multi-beam radar apparatus whose radar beam is a high-frequency radio-wave beam in the millimeter-wave band. This patent also discloses a time-division radar apparatus having a plurality of transmitting units and receiving units for radiating radar beams having approximately the same radiation pattern in a manner such that a portion of each beam spatially overlaps with each other, and for receiving reflection beams. Here, the detection accuracy is improved by suitably determining each combination and arrangement of the transmitting units and receiving units.

However, such a multi-beam radar apparatus has a specific detection area for each combination of the transmitting unit and receiving unit, and the position of a target object, that is, the azimuth (angle) and the distance of a target vehicle are calculated by synthesizing received data which is obtained for each combination of a transmitting unit and a receiving unit. Therefore, if any one of the transmitting units or receiving units is degraded and has a lower sensitivity, it is necessary to detect the unit concerned.

SUMMARY OF THE INVENTION

In consideration of the above circumstances, an objective of the present invention is to provide a multi-beam radar apparatus having a plurality of transmitting units and receiving units, in which an abnormal state of a transmitting or receiving unit due to degradation, problems, or the like, can be detected, thereby preventing problems due to degradation of the sensitivity or the like.

Therefore, the present invention provides a radar apparatus comprising:

a transmitting section including a plurality of beam transmitting units for radiating a plurality of beams, where adjacent beams have an overlapped portion; and a receiving section including a plurality of beam receiving units for receiving reflection waves reflected from a target object, wherein transmitting and receiving combinations between the beam transmitting units and the beam receiving units are determined so as to detect the position of the target object, and the radar apparatus further comprises:

a sensitivity comparing section for comparing sensitivities with respect to the transmitting and receiving combinations; and an abnormal state determination section for determining an abnormal state of any one of the beam transmitting units and the beam receiving units based on a result of the comparison of the sensitivity comparing section.

Typically, the beam transmitting units respectively correspond to the beam receiving units as transmitting/receiving channels, and the transmitting and receiving combinations are determined in each channel and also between adjacent channels; and the sensitivity comparing section compares sensitivities with respect to the combination of each channel, and also compares sensitivities with respect to the combination of each pair of the adjacent channels.

According to the above structure, it is possible to detect the sensitivity with respect to each combination of the transmitting and receiving units. Here, the sensitivity of each combination of the corresponding transmitting and receiving units of the same channel, that is, with respect to each radiated radar beam, is called the individual sensitivity. In contrast, the sensitivity of each combination of the transmitting and receiving units belonging to the adjacent channels is called the adjacent sensitivity. In the latter case, a radar beam is radiated from a beam transmitting unit, and the relevant reflection wave is received by a beam receiving unit belonging to the adjacent channel; thus, the adjacent sensitivity relates to the overlapped portion of the beam radiation patterns of the two channels. By comparing the individual sensitivities with each other, and also by comparing the adjacent sensitivities with each other, an abnormal state such as the sensitivity degradation of any one of the beam transmitting and receiving units can be determined in a uniform environment.

The above radar apparatus may further comprise a transmitting and receiving channel switching section for switching the transmitting and receiving channels of a transmitting and receiving combination between the adjacent channels in a manner such that the channel of the beam sending unit and the channel of the beam receiving unit are replaced with each other.

In this case, (i) the adjacent sensitivity detected when a radar beam transmitted from the transmitting unit of a channel (here, called the first channel) and the relevant reflection wave is received by the beam receiving unit of the adjacent channel (here, called the second channel) and (ii) the adjacent sensitivity detected when a radar beam transmitted from the transmitting unit of the second channel and the relevant reflection wave is received by the beam receiving unit of the first channel can be compared. That is, a plurality of adjacent sensitivities with respect to the same area in a spatially overlapped portion of the radar beams can be detected, and the adjacent sensitivities as well as the individual sensitivities can be respectively compared. Therefore, any one of the beam transmitting and receiving units in an abnormal state, such as sensitivity degradation, can be specified regardless of the state of the target vehicle, that is, in either of the running or stopped state.

If a radar system using the radar apparatus having the above structure is constructed, any one of the beam transmitting and receiving units in an abnormal state such as the sensitivity degradation can be specified and a warning display can be shown on the instrument panel of the present vehicle. Accordingly, the driver or a passenger can be informed of the abnormal state of the radar apparatus and a problem due to the abnormal state can be prevented.

If the abnormal state determination section determines degradation (such as sensitivity degradation or a problem) in any one of the beam transmitting units and the beam receiving units, the radar apparatus preferably further comprises a degradation correcting section for correcting the degradation of the target unit based on the determination of the abnormal state determination section.

For example, the relevant beam transmitting or receiving unit which is determined by the abnormal state determination section to have a lowered sensitivity, or a detected value obtained by the relevant unit in the abnormal state, can be efficiently corrected according to the level of the sensitivity degradation.

Therefore, if it is determined that any one of the beam transmitting units and the beam receiving units has been degraded and thus has a lower sensitivity, the driver or a passenger can be informed of the sensitivity degradation by means of the above warning display or the like, and simultaneously, the degraded sensitivity characteristic can be corrected by the degradation correcting section, thereby normally operating the radar apparatus and the radar system using this radar apparatus.

BRIEF DESCRIPTION OF THE DRAWINGS

FIGS. 2A and 2B are diagrams showing examples of the comparison between the detected sensitivities in the first embodiment. FIG. 2A shows an example in which transmitting circuit Tx1 of channel ch1 has a lower sensitivity, while FIGS. 3A and 3B are diagrams showing examples of the comparison between detected sensitivities in the second embodiment. Both figures show a case of the sensitivity degradation of the transmitting circuit of channel ch1, but FIG. 3A shows adjacent sensitivity $S_{12}$ from channel ch1 to ch2 obtained when a transmitted radar wave radiated from transmitting circuit Tx1 of channel ch1 is detected by the receiving circuit Rx2 of channel ch2.

DESCRIPTION OF THE PREFERRED EMBODIMENTS

Hereinafter, embodiments of the radar apparatus according to the present invention will be explained with reference to the drawings.

Figure 4:
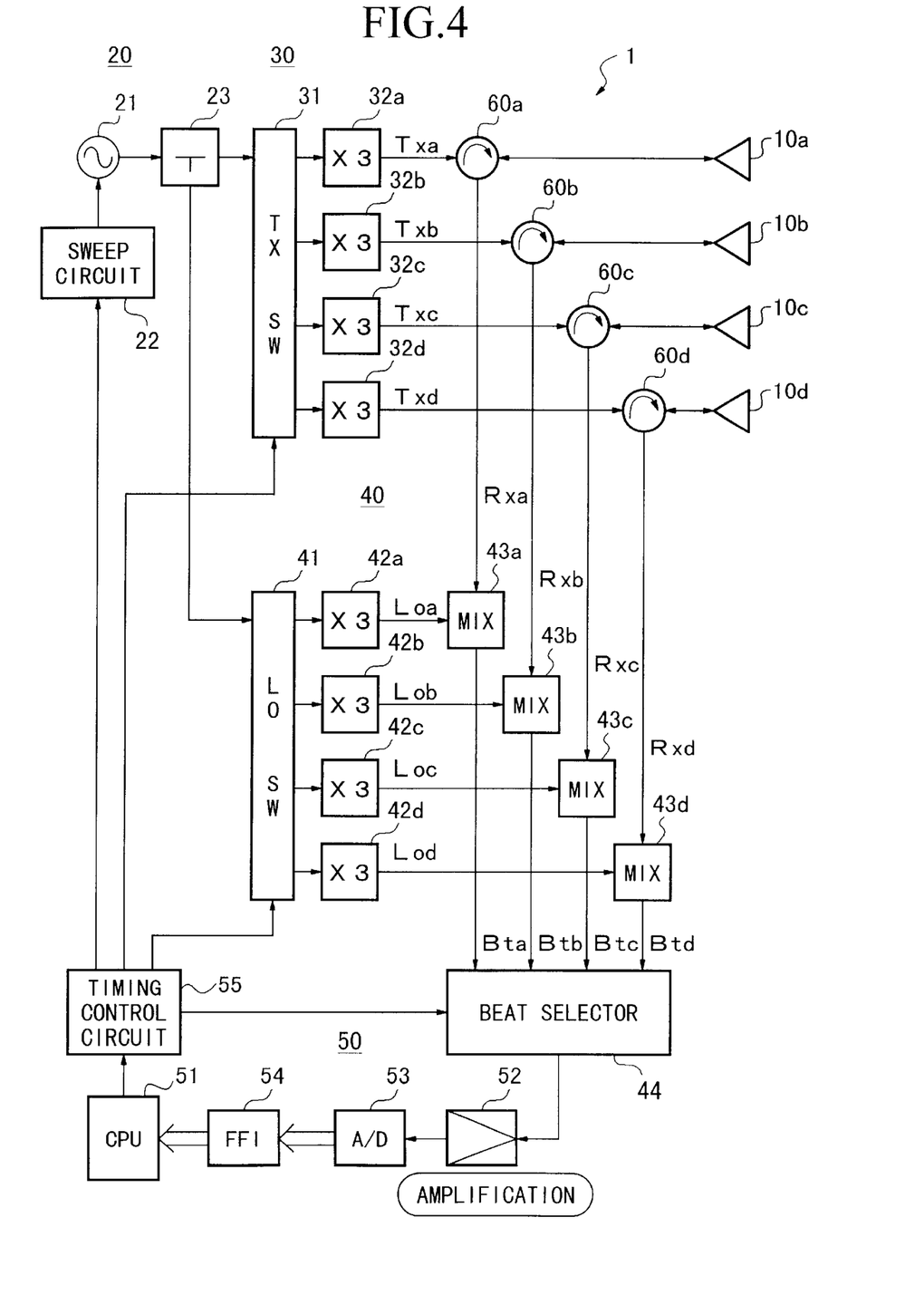
FIG. 4 is a block diagram showing the general structure of the embodiments of the radar apparatus according to the present invention.

FIG. 4 is a block diagram showing the structure of the time-division FN-CW multi-beam radar apparatus as an embodiment of the present invention. This radar apparatus 1 comprises four antennas 10a to 10d (functioning as the beam transmitting units and the beam receiving units of the present invention), FM wave generating circuit 20, 4 ch transmitting section 30 (functioning as the transmitting section of the present invention) having four channels, 4 ch receiving section 40 (functioning as the receiving section of the present invention) having four channels, detection and control circuit 50, and four directional couplers 60a to 60d.

Figure 5:
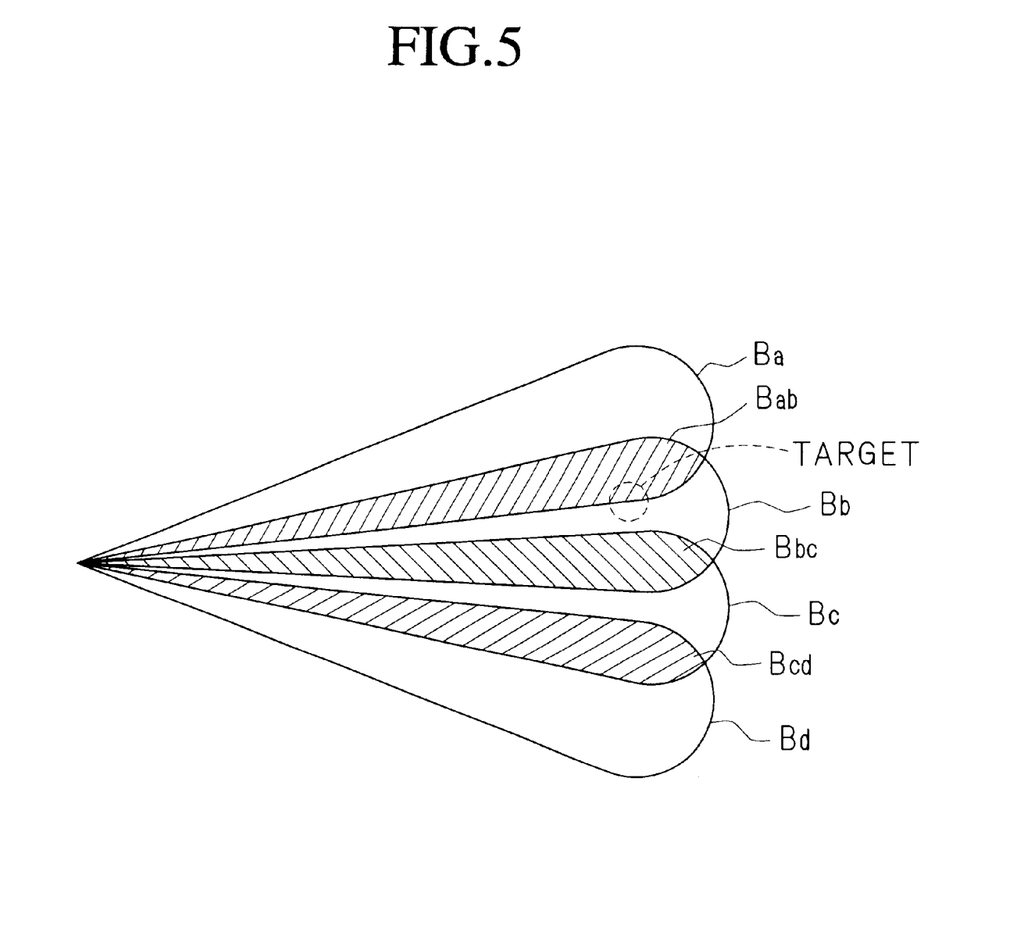
FIG. 5 is a diagram showing radar-beam radiation patterns of the above embodiments of the radar apparatus.

The antennas 10a to 10d may be an offset defocus parabolic multi-beam antenna having beam radiation patterns Ba to Bd shown in FIG. 5.

The FM wave generating circuit 20 comprises voltage-controlled oscillator (VCO) 21 for generating a radio wave belonging to a semi-millimeter band of approximately 20 GHz or 25.7 GHz, sweep circuit 22 for supplying a triangular-wave modulated voltage to the VCO 21, and power dividing circuit 23 for dividing the modulated electric power into the transmitting section 30 and the receiving section 40.

The transmitting section 30 comprises transmission switching circuit 31 for performing switching operations of the modulated power between the antennas, and 3-multiplication circuits 32a to 32d for multiplying the frequency of the transmitted modulated power by 3 so as to convert the power signal to a millimeter-band FM wave of approximately 60 GHz or 77 GHz.

The receiving section 40 comprises local switching circuit 41 for performing switching operations of the local modulated power obtained by the power dividing operation by the power dividing circuit 23, 3-multiplication circuits 42a to 42d for converting the frequency of the local modulated power into the same frequency as the transmitted modulated power, mixing circuits 43a to 43d, and beat selector 44.

The detection and control circuit 50 comprises (central) processing unit (i.e., CPU) 51, amplification circuit 52, and A/D converting circuit 53, and fast Fourier transform (FFT) circuit 54, and timing control circuit 55.

For example, modulated radar waves Txa to Txd, FM waves belonging to a millimeter band of 60 GHz, are supplied via the directional couplers 60a to 60d to antennas 10a to 10d with different timing values, and then radiated from these antennas to a target object.

One or more of the radar waves Txa to Txd radiated from the antennas 10a to 10d may be reflected by the target object, and the reflected waves Rxa to Rxd are received by corresponding antennas 10a to 10d. The waves received by the antennas 10a to 10d are isolated from the transmitted waves by the directional couplers 60a to 60d and the isolated waves are input into the receiving section 40. In the section 40, the input waves are respectively synthesized with local FM waves Loa to Lod by mixing circuits 43a to 43d with predetermined timing, so that beat signals Bta to Btd are respectively generated in the synthesized signals. The beat selector 44 selects the beat signals Bta to Btd (output from the mixing circuits 43a to 43d) in turn, and outputs each selected signal to the detection and control circuit 50.

Each of the beat signals Bta to Btd output into the detection and control circuit 50 is amplified by the amplifying circuit 52 and converted to a digital signal by the A/D converting circuit 53, and then frequency-converted by the FFT circuit 54. As a result, a power spectrum signal having a peak corresponding to the relevant beat frequency is output to the processing unit (CPU) 51.

The processing unit 51 refers to each input power spectrum signal and calculates the propagation delay time of the FM wave with respect to the peak frequency having a power above a predetermined level, and then calculates the distance to the target object based on the calculated propagation delay time data. In addition, the processing unit 51 calculates the azimuth of the target object by performing a weighted average operation using the peak intensities of the power spectra, and determines the position of the target object according to the calculated distance and azimuth.

The above-explained 4 ch transmitting and receiving circuit arrangement can function as a seven-beam radar apparatus by arranging the radar beams as shown in FIG. 5 (i.e., radar beams Ba to Bd) which spatially overlap with each other, and by determining suitable switching timing of the switching operations performed by the transmission switching circuit 31 and the local switching circuit 41.

For example, beat signal Btaa generated by synthesizing the wave transmitted and received by antenna 10a with the local wave Loa, or beat signal Btbb generated by synthesizing the wave transmitted and received by antenna 10b with the local wave Lob are obtained in the radar operation corresponding to each relevant pair of transmitting and receiving circuits. In addition to such operation, another operation using the above-mentioned overlapped portion between the radar beams is possible. For example, radar wave Txa radiated from antenna 10a can be received by antenna 10b, and is synthesized with local wave Lob so as to generate and analyze beat signal Btab, thereby obtaining an effect as if a virtual antenna is provided between antennas 10a and 10b.

Figure 6:
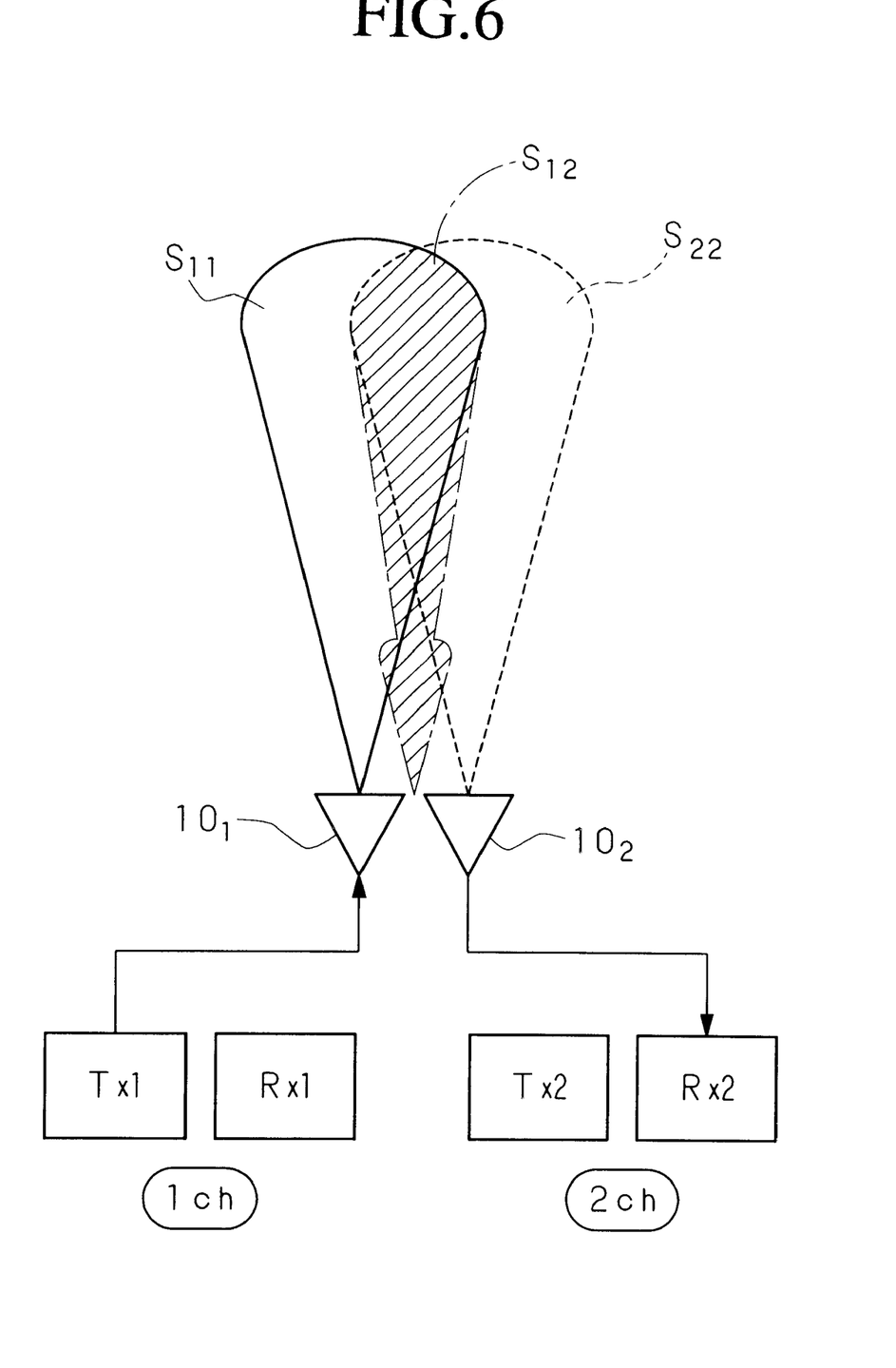
FIG. 6 is a diagram explaining a so-called virtual antenna generated in a spatially overlapped portion of the radar beams in the above embodiments of the radar apparatus.

FIG. 6 is a diagram for simply explaining the above virtual antenna, and any two channels (ch1 and ch2) among the four channels (a to d) shown in FIG. 4 are extracted and shown in FIG. 6, and the sensitivity characteristic of each radar beam according to each combination of the above transmitting and receiving channels is illustrated here.

The sensitivity characteristic $S_{11}$ indicated by a solid line in FIG. 6 shows-detection sensitivity distribution when the radar beam transmitted from transmitting circuit Tx1 of channel ch1 is received by receiving circuit Rx1 of the same channel ch1 (that is, the individual sensitivity of channel ch1). Ch2 is a channel adjacent to channel ch1, and a spatially overlapped portion of the beam is present between these channels. The sensitivity characteristic $S_{22}$ indicated by a dotted line in FIG. 6 shows detection sensitivity distribution when the radar beam transmitted from transmitting circuit Tx2 of channel ch2 is received by receiving circuit Rx2 of the same channel ch2 (that is, the individual sensitivity of channel ch2). In the present embodiment, the radiated radar beam of each channel has substantially the same beam pattern; thus, the above two sensitivity characteristics $S_{11}$ and $S_{22}$ are approximately the same.

The sensitivity characteristic $S_{12}$, indicated by an alternate long and short dash line, and shaded and observed at a center portion of the area including $S_{11}$ and $S_{22}$, is obtained when the radar beam transmitted from transmitting circuit Tx1 of channel ch1 is received by receiving circuit Rx2 of channel ch2 (that is, adjacent sensitivity from channel ch1 to ch2). The signal flow from Tx1 to Rx2 is shown by solid arrows in FIG. 6. Here, in the overlapped portion of channels ch1 and ch2, the same sensitivity characteristic as the individual sensitivity of each channel is obtained, and a weak side lobe is generated in portions other than the overlapped portion.

In the above-explained multi-beam radar apparatus comprising a plurality of transmitting/receiving channels, if a constituent of any channel of the transmitting section 30 and receiving section 40 is degraded, and the transmitting or receiving sensitivity is thus degraded, then the azimuth (angle) of the target object, calculated by the processing unit 51, has an error according to the degradation of the sensitivity.

Figure 1A:
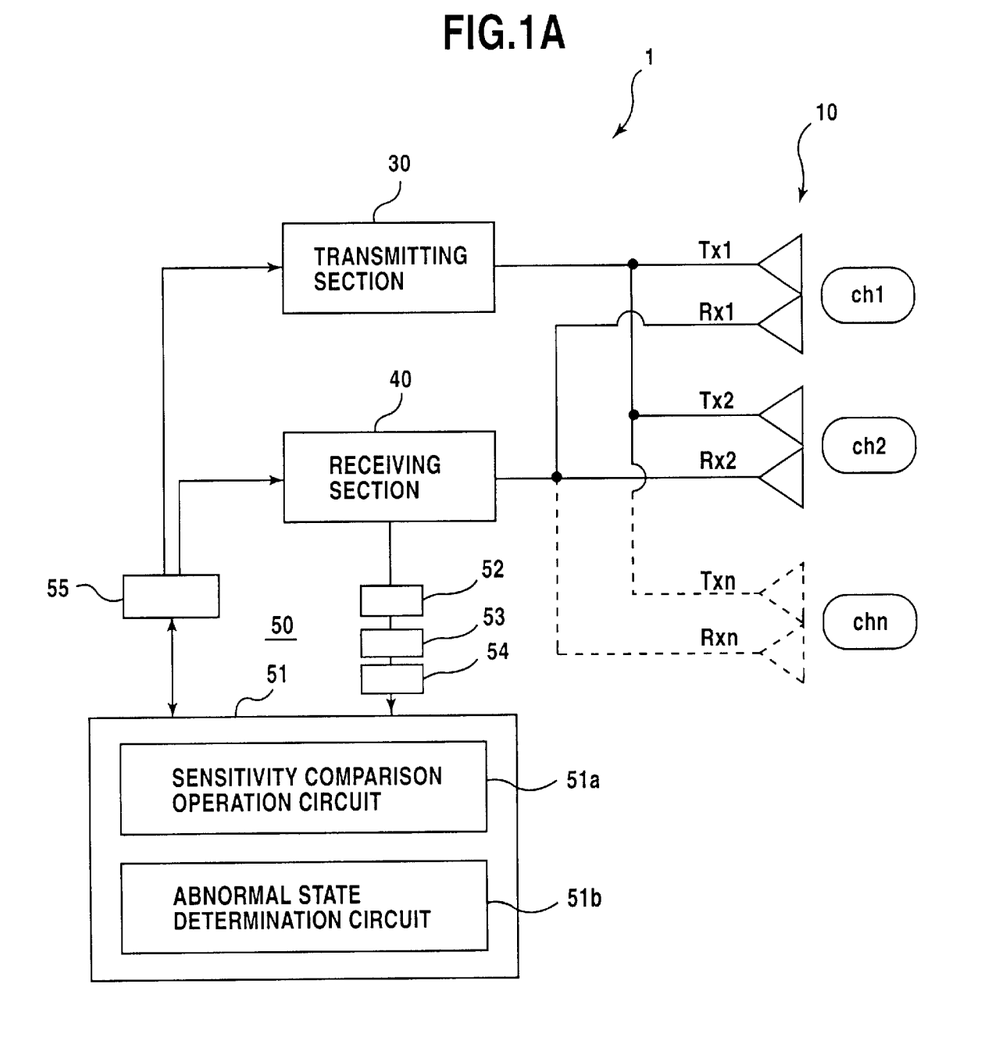
FIGS. 1A to 1C are block diagrams showing the structures of the embodiments of the radar apparatus according to the present invention, and FIGS. 1A to 1C respectively show the structures of the first, second, and third embodiments.

In this first embodiment of the multi-beam radar apparatus in which the adjacent radar beams have a spatially overlapped portion, the processing unit 51 has a sensitivity comparison operation circuit 51a (corresponding to the sensitivity comparing section of the present invention) for comparing the sensitivity values of each combination between the beam transmitting and receiving channels, and abnormal state determination circuit 51b (corresponding to the abnormal state determination section of the present invention) for determining an abnormal state of a beam transmitting or receiving channel based on the compared results obtained by the sensitivity comparison operation circuit 51a (see FIG. 1A).

In the multi-beam radar apparatus having the above structure, comparison operations between the individual sensitivities, between the adjacent sensitivities, and between the individual and adjacent sensitivities are performed.

Figure 2A:
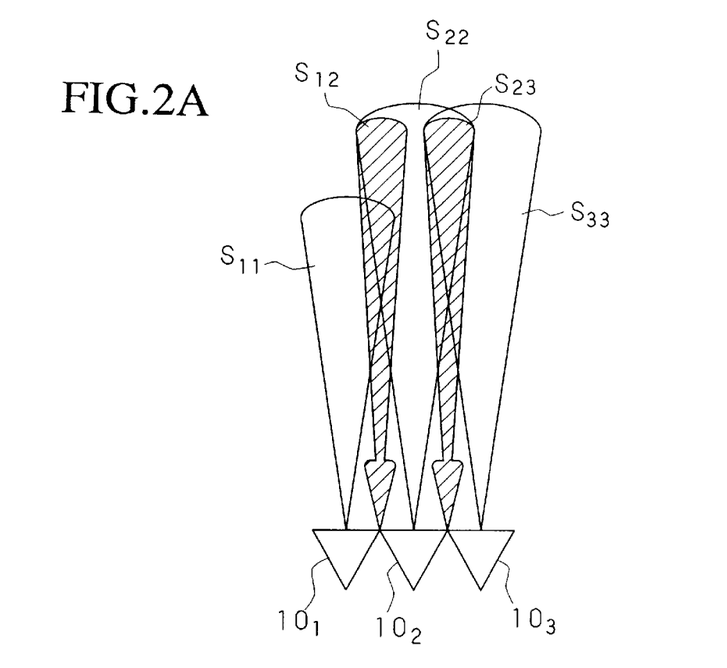
Figure 2B:
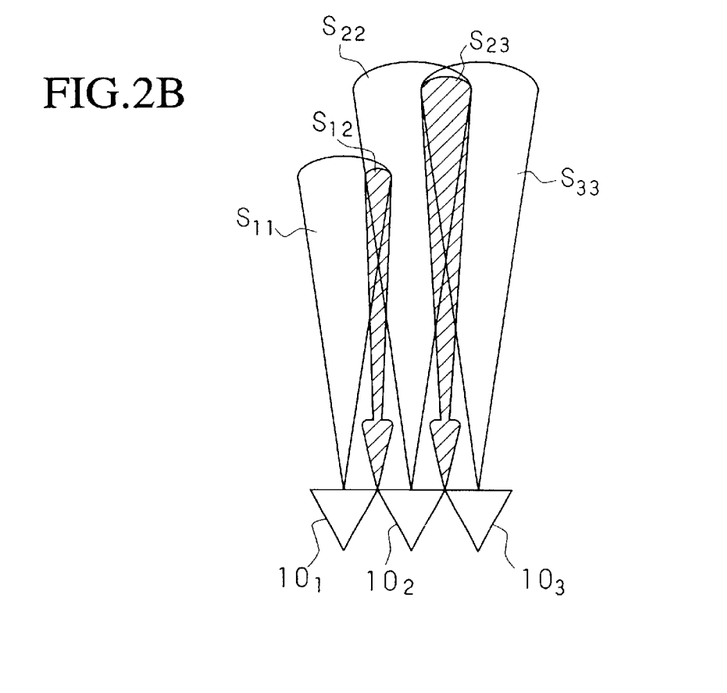
FIG. 2B shows an example in which receiving circuit Rx1 of channel ch1 has a lower sensitivity

FIGS. 2A and 2B show examples of the results of the sensitivity measurements of the radar apparatus, performed in a uniform environment. In both the examples, the individual sensitivity $S_{11}$, of channel ch1 is lower than the individual sensitivities $S_{22}$ and $S_{33}$ of the other channels. Therefore, it is obvious that,channel ch1 is in an abnormal state; however, only according to such comparison of the individual sensitivities, it is impossible to determine which of the transmitting circuit Tx1 and receiving circuit Rx1 of channel ch1 is degraded.

Here, the adjacent sensitivity $S_{12}$ from ch1 to ch2 and the adjacent sensitivity $S_{23}$ from ch2 to ch3 are also compared. In the example shown in FIG. 2A, both adjacent sensitivities $S_{12}$ and $S_{23}$ have the same level. This indicates that the transmitting circuit Tx1 is in a normal state and a radar beam having the normal level can be transmitted from this transmitting circuit (therefore, adjacent sensitivity $S_{12}$ has the normal level); however, the receiving circuit Rx1 is in an abnormal state and thus the individual sensitivity $S_{11}$ is lower.

In contrast, in the example shown in FIG. 2B, the relationship between the individual sensitivities is $S_{11}<S_{22}=S_{33}$, and the relationship between the adjacent. sensitivities is $S_{12}<S_{23}$. Therefore, it is determined that the transmitting circuit Tx1 of ch1 is in an abnormal state and the intensity of the radiated beam is lower, and thus the individual sensitivity of channel ch1 is lower and accordingly, the adjacent sensitivity $S_{12}$ detected in channel ch2 is lower.

If the peak values of the individual sensitivity $S_{11}$, and the adjacent sensitivity $S_{12}$ are compared so as to have much more reliable results, then these peaks have substantially the same level, and thus it is obvious that the transmitting circuit Tx1 of channel ch1 has been degraded.

In the radar apparatus of the present embodiment, the comparison operation between the individual sensitivity detected for each transmitting/receiving channel and the adjacent sensitivity detected with respect to each overlapped portion of the beams is performed by the sensitivity comparison operation circuit 51a, and the result of the comparison operation is output into the abnormal state determination circuit 51b. The determination circuit 51b refers to the input operation result, and determines an abnormal state if the difference (of the sensitivity level) obtained by the comparison operation is equal to or more than a predetermined level (e.g., 2 dB). If an abnormal state is determined, the determination circuit 51b further determines (i) the relevant (i.e., abnormal) channel, (ii) which of the transmitting and receiving circuits is abnormal, (iii) the specification of the abnormal state (such as sensitivity degradation or a problem), and the like.

When the abnormal state is determined as explained above, a message indicating the abnormal state of the radar apparatus (and information on the abnormal circuit, or specification of the abnormal state, if necessary) is shown where it can be easily observed by the driver or a passenger, such as the instrument panel of the vehicle.

If a radar system such as the ACC (adaptive cruise control) system is constructed using the present radar apparatus, the system is informed of the abnormal state of the radar apparatus and a necessary indication such as a warning or alarm display is shown at the system side. The ACC mode may be released at the time when such a warning display is shown.

Accordingly, the driver or a passenger can recognize the abnormal state (and the abnormal circuit and the specification, if necessary) of the radar apparatus. Additionally, in the radar system using the present radar apparatus, an azimuth error can be predicted. Therefore, problems due to such an error can be prevented.

Figure 1B:
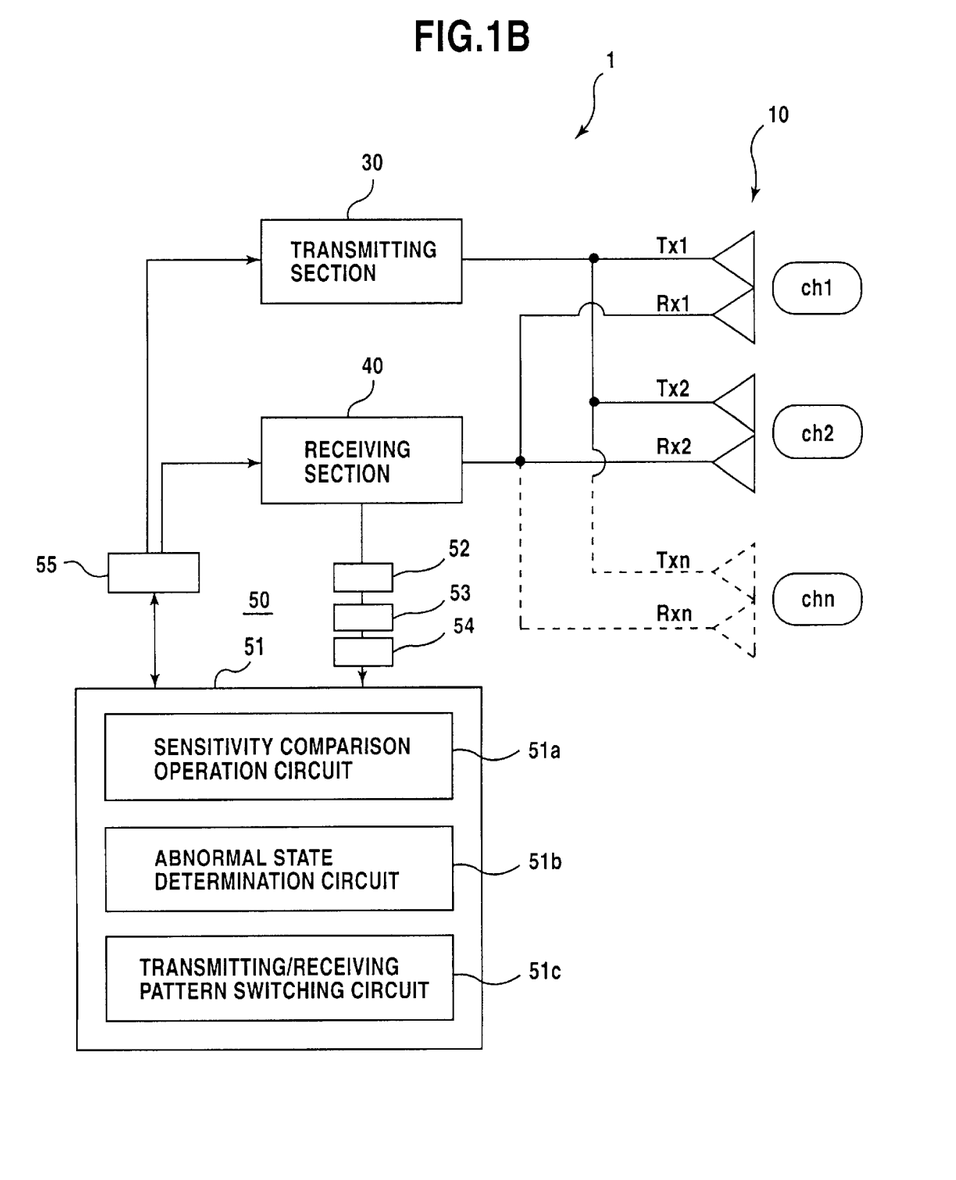
Figure 1C:
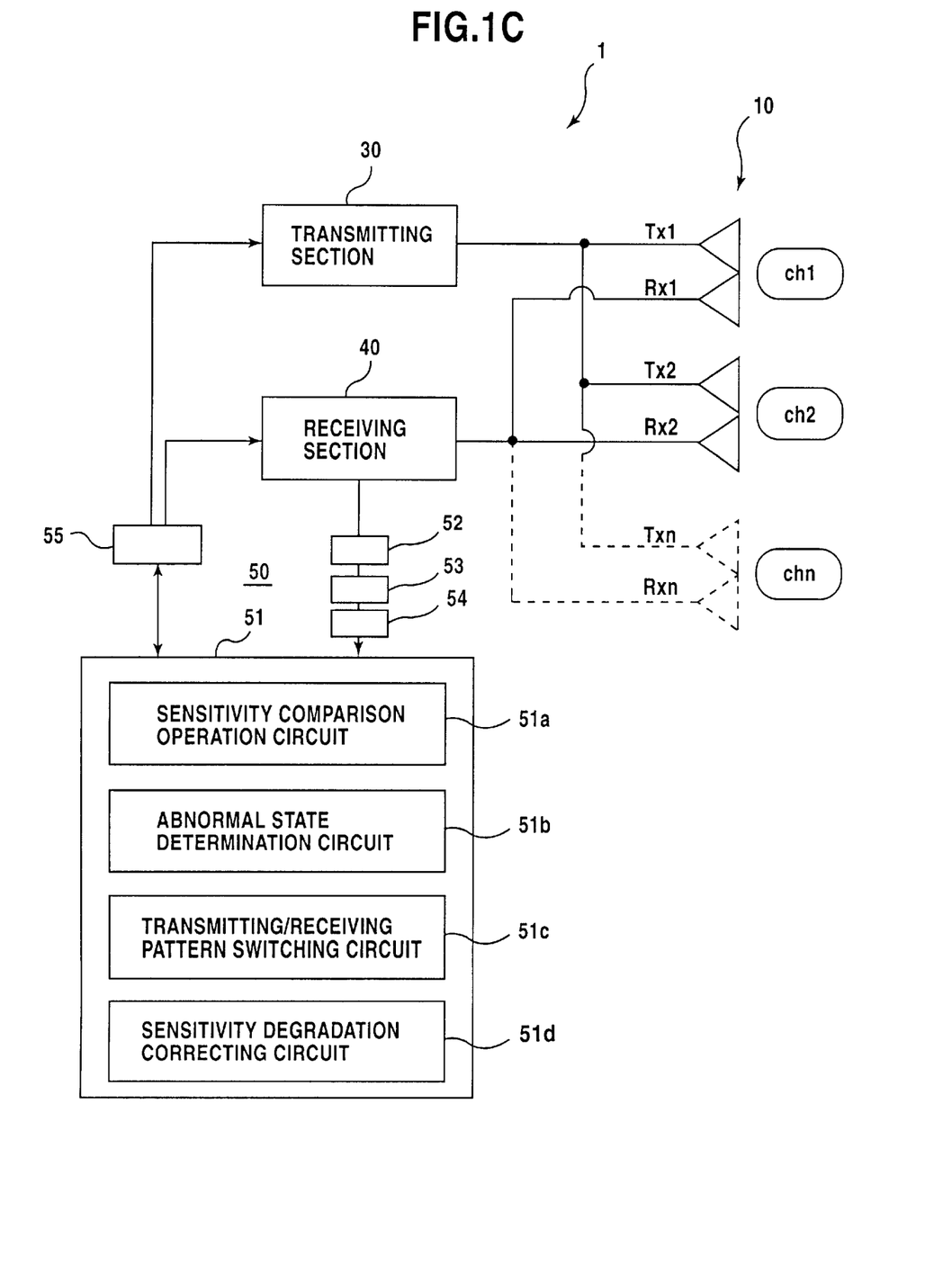

Hereinbelow, the second embodiment of the radar apparatus according to the present invention will be explained. In this embodiment, in addition to the structure of the above first embodiment, transmitting/receiving pattern switching circuit 51c (corresponding to the transmitting and receiving combination switching section of the present invention) is provided in the processing unit 51, thereby realizing a multi-beam radar apparatus (see FIG. 1B).

This transmitting/receiving pattern switching circuit 51c is provided for switching the combination between the transmitting and receiving circuits comprising a plurality of antennas, so as to generate and operate different transmitting/receiving patterns. That is, the switching circuit 51c controls the opening and closing timing of each of the transmission switching circuit 31 and the reception (or local) switching circuit 41 shown in FIG. 4.

More specifically, if each transmitting/receiving pattern is indicated as combination pattern "TxnRxn" (here, Txn and Rxn respectively indicate the transmitting circuit and the receiving circuit, and "n" means the channel number (1 to 4)), then, in the above first embodiment, the combination patterns are determined in a specific direction or flow such as Tx1Rx1→Tx1Rx2→Tx2Rx2→Tx2Rx3→Tx3Rx3, and the above-mentioned virtual antenna is a fixed transmitting/receiving pattern determined in the above flow.

The above combination patterns can be changed using the transmitting/receiving pattern switching circuit 51c of the second embodiment. For example, the virtual antenna transmitting/receiving pattern Tx1Rx2 in the above flow is switched to the "opposite" pattern Tx2Rx1 and the virtual antenna transmitting/receiving pattern Tx2Rx3 in the above flow is also switched to the opposite pattern Tx3Rx2 in the transmitting and receiving operations, and the sensitivity comparison operation circuit 51a performs comparison operations between the adjacent sensitivities $S_{12}$ and $S_{21}$, and between the adjacent sensitivities $S_{23}$ and $S_{32}$, detected using the above switched transmitting/receiving patterns. If all the transmitting and receiving circuits belonging to channels ch1 to ch4 are not in an abnormal state such as the sensitivity degradation, then the sensitivities $S_{12}$ and $S_{21}$, are detected to have the same sensitivity characteristic at any time and the adjacent $S_{23}$ and $S_{32}$ are also detected to have the same sensitivity characteristic at any time. In this normal state of the radar apparatus, if the switched beam radiation patterns of the compared sensitivities are different from each other, the detected sensitivity characteristics are related to each other in a correspondence relationship.

Figure 3A:
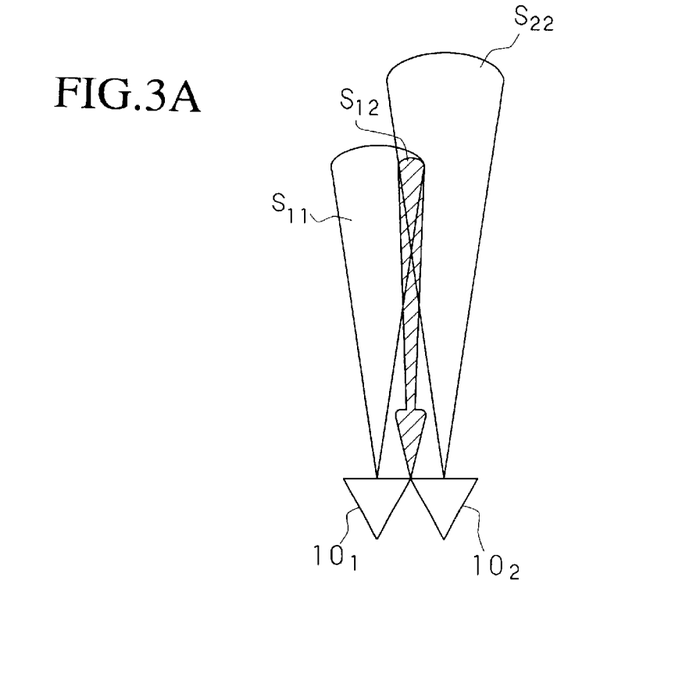
Figure 3B:
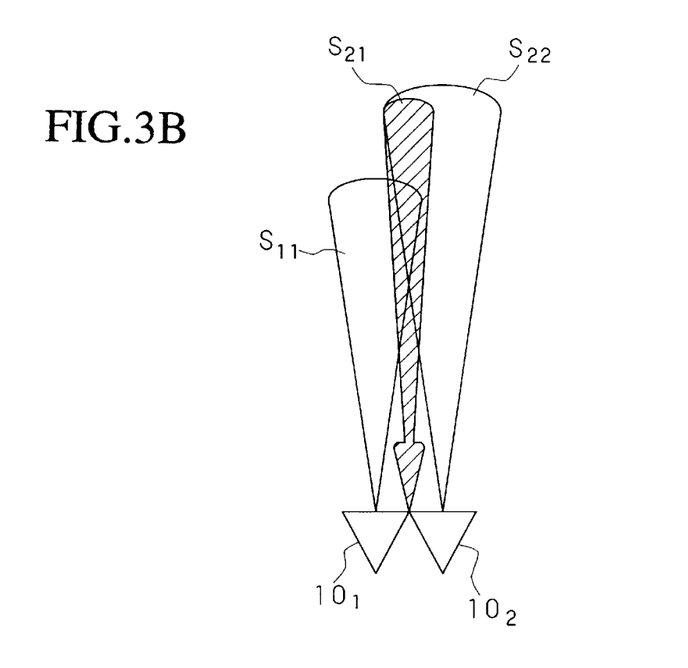
FIG. 3B shows adjacent sensitivity $S_{21}$ from channel ch2 to ch1 obtained when the channel of the transmitting circuit and the channel of the receiving circuit are replaced with each other.

FIGS. 3A and 3B show the detected results of an example of the sensitivity measurements in which the transmitting/receiving pattern is switched at a specific time. FIG. 3A indicates adjacent sensitivity $S_{12}$ from channel ch1 to channel ch2 and individual sensitivities $S_{11}$ and $S_{22}$ of channels ch1 and ch2, while FIG. 3B indicates adjacent sensitivity S2, from channel ch2 to channel ch1 and the individual sensitivities $S_{11}$, and $S_{22}$.

In this example, as shown in FIG. 3A, the individual sensitivity $S_{11}$, of channel ch1 is lower than the individual sensitivity $S_{22}$ of channel ch2; thus, an abnormal state of channel ch1 can be predicted. However, only according to the comparison of the individual sensitivities, it is impossible to determine which of the transmitting circuit Tx1 and receiving circuit Rx1 is degraded.

Here, if the order of the transmitting and receiving operations is changed by the transmitting/receiving pattern switching circuit 51c so as to detect adjacent sensitivity $S_{21}$, and the adjacent sensitivities $S_{12}$ and $S_{21}$ are also compared, it is obvious that the sensitivity of the transmitting circuit Tx1 of channel ch1 is degraded in this example. That is, circuit Tx1 or Rx1 is in an abnormal state because the adjacent sensitivity $S_{12}$ is lower, and it is determined that the circuit Rx1 is normal but Tx1 is in an abnormal state because the adjacent sensitivity $S_{21}$ is higher. If $S_{12} > S_{21}$ in the above example, it can be determined that circuit Tx1 is in an abnormal state.

The result of each comparison operation between the individual sensitivities and between the adjacent sensitivities is sent from the sensitivity comparison operation circuit 51a to the abnormal state determination circuit 51b functioning as the abnormal state determination section of the present invention. The abnormal state determination circuit 51b refers to the operation result and determines an abnormal state if the relevant sensitivity difference is equal to or more than a predetermined level. If an abnormal state is determined, the determination circuit 51b also determines (i) the abnormal channel, (ii) which of the transmitting and receiving circuits is abnormal, and (iii) the specification of the abnormal state. The determined results are then communicated to the driver or a passenger by means similar to those in the first embodiment.

Therefore, the driver or passenger can recognize an abnormal state of the radar apparatus (and the abnormal circuit with a lower sensitivity, if necessary), and an azimuth error can be predicted in the radar system employing the present radar apparatus; thus, problems due to such an error can be prevented.

Here, in the second embodiment, the individual and adjacent sensitivities with respect only to two beams (e.g., the beams of channel ch1 and ch2 in the above-explained example) having an overlapped portion are compared for detecting an abnormal state. In addition, the adjacent sensitivities to be compared are measured in the same area within a very short time. Therefore, the measurement environment for detecting an abnormal state is not limited.

Accordingly, in the sensitivity measurement, it is unnecessary to fix a target object having a fixed distance from the present vehicle and having a specific characteristic of its form (these are necessary for the conventional apparatus). For example, even if the present vehicle is running on a street or road, an abnormal state of the transmitting or receiving circuit of the radar apparatus can be detected and specified.

Below, the third embodiment of the radar apparatus according to the present invention will be explained. In addition to the structural elements explained in the above first and second embodiments, the structure of the third embodiment further comprises sensitivity degradation correcting circuit 51d provided in processing unit 51. This correcting circuit 51d corrects degradation of the beam transmitting or receiving circuit on a result of a determination (by the abnormal state determination circuit 51b) that the relevant circuit is degraded due to sensitivity degradation or a problem.

The correction of degradation is performed by, for example, (i) a switching operation (for making the correcting operation effective) by the driver or a passenger who has been informed of an abnormal state of the radar apparatus or radar system as explained in the above embodiments, or (ii) activating the sensitivity degradation correcting circuit 51d when the above indication (such as a warning operation) of an abnormal state is shown, and displaying the activation of the automatic sensitivity correction.

The radar apparatus obtained by adding the sensitivity degradation correcting circuit 51d to the structure of the radar apparatus of the second embodiment will be explained below.

As explained above, the sensitivities and the differences between them, obtained by the comparison operations performed by the sensitivity comparison operation circuit 51a, are input into the abnormal state determination circuit 51b. The determination circuit 51b then determines an abnormal state if the input operation results indicate a difference of the sensitivity level being equal to or more than a predetermined level, and also determines (i) the abnormal channel, (ii) which of the transmitting and receiving circuits is abnormal, (ii) the specification of the abnormal state (i.e., sensitivity degradation or a problem), and the like.

Also as explained above, each difference between relevant sensitivity levels is input from the sensitivity comparison operation circuit 51a into the abnormal state determination circuit 51b, and in the circuit 51b, the abnormal channel and (transmitting or receiving) circuit are specified based on the input data. Therefore, the sensitivity degradation correcting circuit 51d executes the degradation correction process based on a "channel circuit" (which means a combination circuit of relevant transmitting and receiving circuits) specified by the abnormal state determination circuit 51b, and on the level of the sensitivity degradation. The corrected data (i.e., data after the correcting operation) is output into processing unit 51, and the processing unit 51 then calculates the position of the target object based on the corrected data.

The following are specific examples of the correction of the degradation:

(1) the detected data of the abnormal channel circuit is not used for calculating the position of the target object, (2) the detected data of the abnormal channel circuit is corrected by the degraded level, and the corrected data is used for calculating the position of the target object, (3) as for the virtual radar beams and thus the reciprocal adjacent sensitivity data, the detected data having a higher sensitivity is used for calculating the position of the target object, and (4) an average value of the above reciprocal data is used.

In the explanation below, the above correcting example (2) is used when the abnormal state determination circuit 51b determines the sensitivity degradation. For example, in the case shown in FIG. 3A, the transmitting circuit Tx1 of channel ch1 has been degraded, and thus individual sensitivity $S_{11}$ and adjacent sensitivity $S_{12}$ are lower. There are two possible types of correcting methods which can be employed here: one is to increase the transmission level of transmitting circuit Tx1 by the degraded level, and the other is to increase the sensitivity of the receiving circuit which receives a wave transmitted from the transmitting circuit Tx1 by the degraded level or to perform a correcting operation equivalent to this level-increasing operation.

Any one of the above two type methods can be suitably chosen according to the structure of the radar apparatus. In the present embodiment, the latter one is chosen, and a correcting operation equivalent to the level-increasing operation of the receiving sensitivity is performed. In this case, the target signal to be corrected is not the signal from the individual receiving circuit such as Rx1, but a signal from a combination of receiving circuits such as Rx1 and Rx2 which receive a wave transmitted from the transmitting circuit Tx1, and this signal is a detected signal (for example, a power spectrum obtained by FFT-processing signals Btaa and Btab in the above embodiments) corresponding to the individual sensitivity $S_{11}$ and adjacent sensitivity $S_{12}$.

The sensitivity degradation correcting circuit 51d calculates a sensitivity correction coefficient according to the difference of the sensitivity level calculated by the sensitivity comparison operation circuit 51a, and operates the calculated correction coefficient on the above detected signal (here, the peak intensity of the power spectrum) and outputs the operation result to the processing unit 51. The processing unit 51 executes the operation process based on the detected signal having a corrected sensitivity, and determines the position of the target object. Here, the sensitivity degradation correcting circuit 51d may output the sensitivity correction coefficient to the processing unit 51, and the coefficient may be operated by an operation circuit provided in the processing unit.

In the above embodiments, the specification of the abnormal state is the sensitivity degradation due to the degradation of any circuit. However, a problem in any circuit also leads to an abnormal state, for example, when the detected sensitivity is extremely low and the adjacent sensitivity is extremely high. The operation of the sensitivity degradation correcting circuit 51d corresponding to such a problem will be explained below.

First, the abnormal state determination circuit 51b specifies the channel and circuit having a problem according to each sensitivity and the difference of the sensitivity level output from the sensitivity comparison operation circuit 51a, and determines a problem. The sensitivity degradation correcting circuit 51d does not perform the correcting operation of the above method (2) for the detected signal of the channel circuit (a combination circuit of transmitting and receiving circuits) which has been determined by the abnormal state determination circuit 51b to have a problem, but performs the correcting operation of the above method (1). That is, the detected signal (i.e., the power spectrum) of the relevant channel circuit having a problem is multiplied by a sensitivity correction coefficient of 0 or the like, so as to output the detected signal having no peak (intensity), and a correction data indicating that the detected data is not used for detecting the position of the target object is output to the processing unit 51.

Based on the correction data, the processing unit 51 excludes the detected signal of the relevant channel circuit (having a problem) in the position calculation, and calculates and determines the position of the target object by using the remaining detected signal data. Here, a value for specifying and indicating a problem may be defined as the sensitivity correction coefficient. In this case, the sensitivity degradation correcting circuit 51d outputs the defined correction coefficient to the processing unit 51 so that the processing unit 51 does not use the detected signal of the channel circuit having a problem, according to the defined value of the sensitivity correction coefficient.

As for the method for indicating each abnormal state to the driver or a passenger, preferably, different methods are used for each kind of abnormal state, for example, a warning operation is performed in the case of the sensitivity degradation (as explained in the previous embodiments), while an alarm indication is shown in the case of a problem. In addition to such indication, the relevant degradation or the detection characteristic of the transmitting/receiving circuit having a problem is corrected by the degradation correcting circuit (corresponding to the degradation correcting section of the present invention), thereby normally operating the radar apparatus and the radar system using the same.

In the above-explained embodiments, four pairs of the transmitting and receiving circuits are provided, and the 7-beam millimeter-wave FM-CW radar apparatus is realized by changing the combination arrangement between the above transmitting and receiving circuits. However, the present invention is not limited to those embodiments, but various modifications are possible, for example, the number of the provided transmitting and receiving circuits is increased or decreased, the number of spatially overlapped radar beams is increased, and different radar wavelengths are used, and the radar apparatus is used as a pulse radar.

Additionally, in the above embodiments, the compared radar beams have substantially the same radiation pattern to simplify the explanations. However, the compared radar beams may have different radiation patterns, but the different patterns must have a specific relationship so as to compare the detected signals in the processing unit (i.e., in the sensitivity comparison operation circuit). Therefore, the radar beam characteristics can be suitably defined such that the radar beams arranged (or radiated) on the left and right sides of the vehicle have a larger radiation angle, or the radiation angle is increased with a specific increase rate from the center area to the left and right side of the vehicle.

What is claimed is:

1. A radar apparatus comprising:
a transmitting section including a plurality of beam transmitting units for radiating a plurality of beams, where adjacent beams have an overlapped portion; and
a receiving section including a plurality of beam receiving units for receiving reflection waves reflected from a target object,
wherein transmitting and receiving combinations between the beam transmitting units and the beam receiving units are determined so as to detect the position of the target object, and
the radar apparatus further comprises:
a sensitivity comparing section for comparing sensitivities with respect to the transmitting and receiving combinations; and
an abnormal state determination section for determining an abnormal state of any one of the beam transmitting units and the beam receiving units based on a result of the comparison of the sensitivity comparing section.

2. A radar apparatus as claimed in claim 1, wherein:
the beam transmitting units respectively correspond to the beam receiving units as transmitting/receiving channels, and the transmitting and receiving combinations are determined in each channel and also between adjacent channels; and
the sensitivity comparing section compares sensitivities with respect to the combination of each channel, and also compares sensitivities with respect to the combination of each pair of the adjacent channels.

3. A radar apparatus as claimed in claim 2, further comprising:
a transmitting and receiving channel switching section for switching the transmitting and receiving channels of a transmitting and receiving combination between the adjacent channels in a manner such that the channel of the beam sending unit and the channel of the beam receiving unit are replaced with each other.

4. A radar apparatus as claimed in claim 1, wherein:
the abnormal state determination section determines degradation of any one of the beam transmitting units and the beam receiving units, and
the radar apparatus further comprises:
a degradation correcting section for correcting the degradation of the target unit based on the determination of the abnormal state determination section.

5. A radar apparatus as claimed in claim 2, wherein:
the abnormal state determination section determines degradation of any one of the beam transmitting units and the beam receiving units, and
the radar apparatus further comprises:
a degradation correcting section for correcting the degradation of the target unit based on the determination of the abnormal state determination section.

6. A radar apparatus as claimed in claim 3, wherein:
the abnormal state determination section determines degradation of any one of the beam transmitting units and the beam receiving units, and
the radar apparatus further comprises:
a degradation correcting section for correcting the degradation of the target unit based on the determination of the abnormal state determination section.

* * * * *